United States Patent [19]
Allan

[11] Patent Number: 5,088,162
[45] Date of Patent: Feb. 18, 1992

[54] CONNECTOR APPARATUS

[76] Inventor: Robert M. Allan, 1631 Colgate Cir., La Jolla, Calif. 92037

[21] Appl. No.: 553,258

[22] Filed: Jul. 16, 1990

[51] Int. Cl.$^5$ .............................................. A44B 18/00
[52] U.S. Cl. ...................................... 24/442; 24/306; 24/587; 383/63
[58] Field of Search ................. 24/442, 446, 449, 450, 24/452, 304, 306, 16 PB, 30.5 P, 17 AP, 587; 383/63, 65

[56] References Cited

U.S. PATENT DOCUMENTS

| Re. 14,762 | 11/1919 | Springer . |
|---|---|---|
| 410,447 | 9/1889 | Rich . |
| 495,775 | 4/1893 | Bonnamy . |
| 772,412 | 10/1904 | Garrett et al. . |
| 983,093 | 1/1911 | Svenson . |
| 1,330,737 | 2/1920 | Coffman . |
| 1,751,926 | 3/1930 | Kielberg . |
| 1,912,180 | 5/1933 | Cornell . |
| 2,144,755 | 1/1939 | Freedman . |
| 2,249,764 | 7/1941 | Hothersall . |
| 2,499,898 | 3/1950 | Anderson . |
| 2,693,875 | 11/1954 | Cahffee . |
| 2,693,975 | 11/1954 | Chaffee . |
| 2,766,814 | 10/1956 | Sedlacek . |
| 2,841,850 | 7/1958 | Zahorski . |
| 2,979,119 | 4/1961 | Kramer ........................... 24/265 C |
| 2,994,117 | 8/1961 | McMullin ............................ 24/587 |
| 3,009,235 | 11/1961 | Mestral . |
| 3,015,869 | 1/1962 | Rapata . |
| 3,020,613 | 2/1962 | Morin . |
| 3,066,366 | 12/1962 | Wyckoff et al. . |
| 3,078,532 | 2/1963 | Bywater . |
| 3,083,737 | 4/1963 | Mestral . |
| 3,101,517 | 8/1963 | Fox et al. . |
| 3,141,221 | 7/1964 | Faulls, Jr. . |
| 3,192,589 | 7/1965 | Pearson . |
| 3,247,848 | 4/1966 | Mathison . |
| 3,263,292 | 8/1966 | Fekete . |
| 3,266,113 | 8/1966 | Flanagan, Jr. . |
| 3,338,285 | 8/1967 | Jaster . |
| 3,347,298 | 10/1967 | Ausnit et al. . |
| 3,353,662 | 11/1967 | Pickin . |
| 3,364,530 | 1/1968 | Kraus . |
| 3,403,429 | 10/1968 | Smith . |
| 3,408,705 | 11/1968 | Kayser et al. . |
| 3,410,327 | 11/1968 | Ausnit . |
| 3,416,991 | 12/1968 | Yoshimura . |
| 3,494,244 | 2/1968 | Wayland . |
| 3,514,815 | 4/1968 | Evans . |
| 3,518,727 | 4/1968 | Eberle et al. . |
| 3,534,780 | 10/1970 | Hockmeyer et al. . |
| 3,572,191 | 3/1971 | Bannies . |
| 3,592,428 | 7/1971 | McFarlane . |
| 3,600,027 | 8/1971 | Noland et al. . |
| 3,619,913 | 11/1971 | Albrecht . |
| 3,620,896 | 11/1971 | Glasgow . |
| 3,633,787 | 1/1972 | Katz . |
| 3,648,404 | 3/1972 | Ogsbury et al. . |
| 3,654,052 | 4/1972 | Rye . |
| 3,686,718 | 8/1972 | Brumlik . |
| 3,735,449 | 5/1973 | Rosales . |
| 3,808,648 | 5/1974 | Billarant et al. . |
| 3,808,649 | 5/1974 | Ausnit . |
| 3,900,652 | 8/1975 | Uraya et al. ........................... 24/450 |
| 4,073,090 | 2/1978 | Lucia . |
| 4,169,303 | 10/1979 | Lemelson . |
| 4,290,174 | 9/1981 | Kalleberg . |
| 4,322,875 | 4/1982 | Brown et al. . |
| 4,557,024 | 12/1985 | Roberts et al. . |
| 4,674,778 | 6/1987 | Ruiz . |
| 4,872,242 | 10/1989 | Allan . |
| 4,910,362 | 3/1990 | Kinner ................................ 24/304 |
| 4,947,525 | 8/1990 | Van Erden . |

FOREIGN PATENT DOCUMENTS

| 2213686 | 10/1972 | Fed. Rep. of Germany ........ 24/452 |
|---|---|---|
| 1232367 | 10/1960 | France ................................ 24/442 |
| 0376328 | 5/1964 | Switzerland ......................... 24/587 |
| 0898124 | 6/1962 | United Kingdom ................. 24/587 |

*Primary Examiner*—Victor N. Sakran
*Attorney, Agent, or Firm*—William W. Haefliger

[57] ABSTRACT

An elongated two part strap-like connector having a series of generally "C" shaped cross-sections in planes crosswise or parallel to the length dimension of the first body part, the second body part of the connector having ridges configured to yieldably nest and be held; and teeth may be provided to be outstanding from and spaced apart on the body, or internal within the body, the teeth configured to mesh into valleys between the teeth or openings in the body. Random sections of the connector may be affixed to two objects so as to allow their connection. Also disclosed are other improvements and applications.

53 Claims, 4 Drawing Sheets

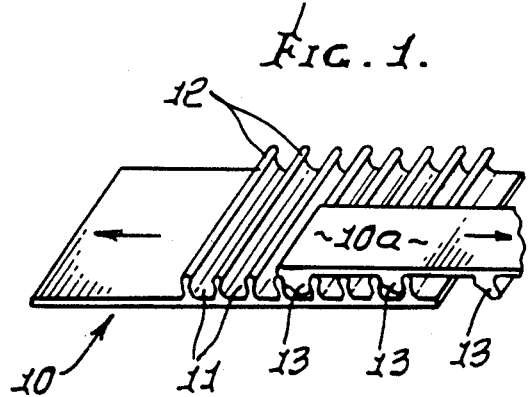
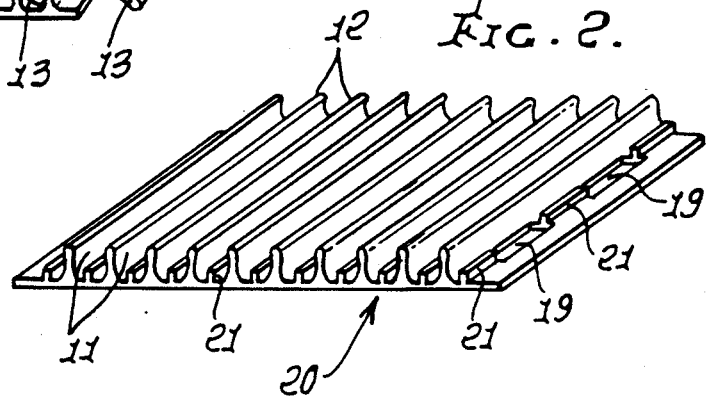
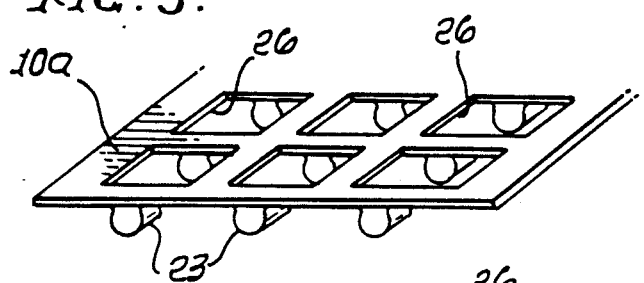
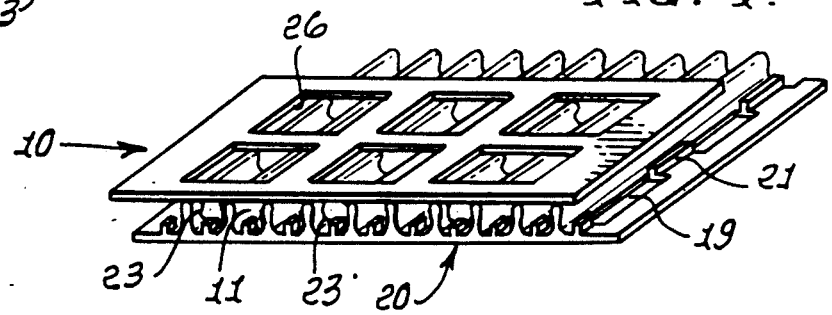
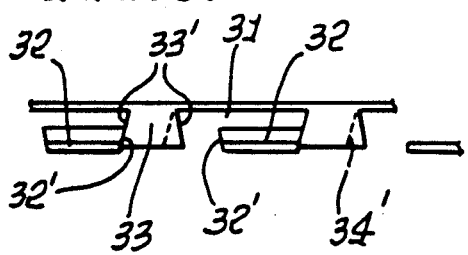
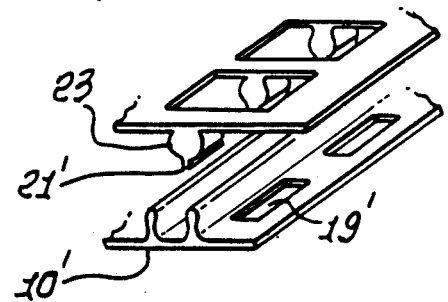

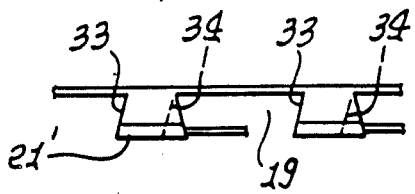
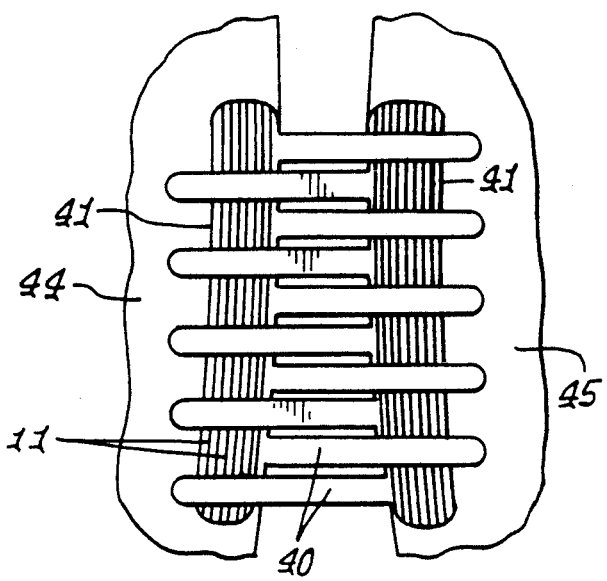
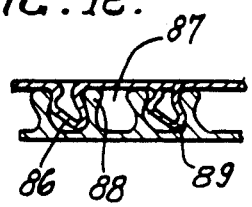
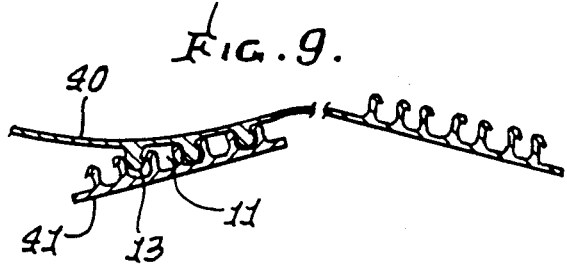
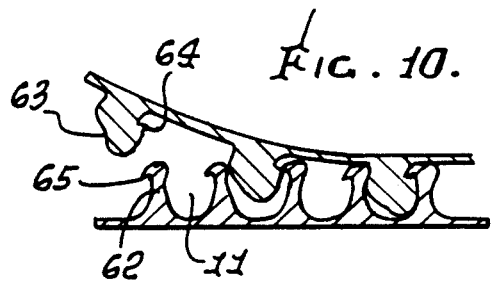
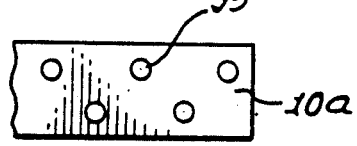
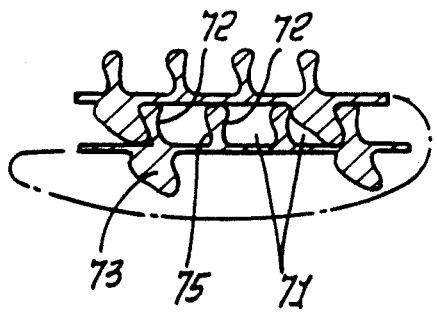
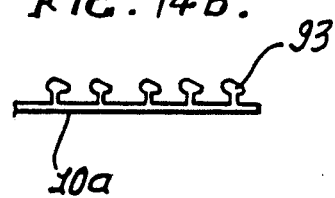

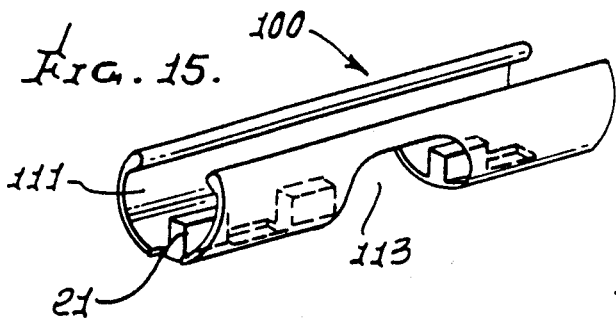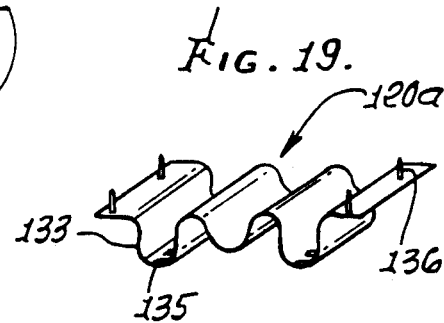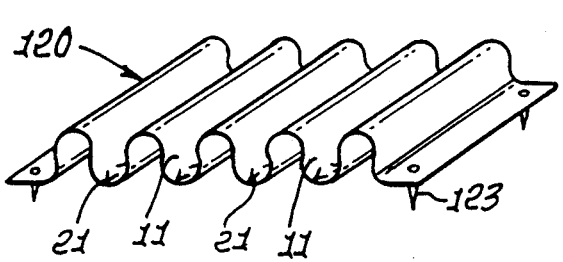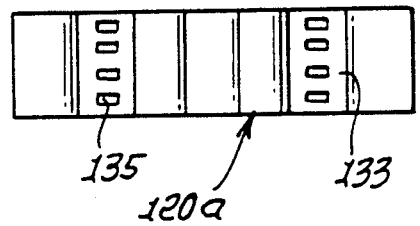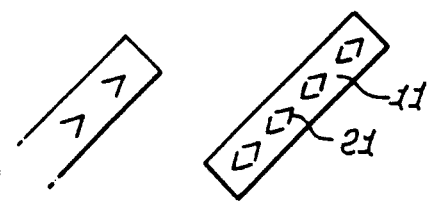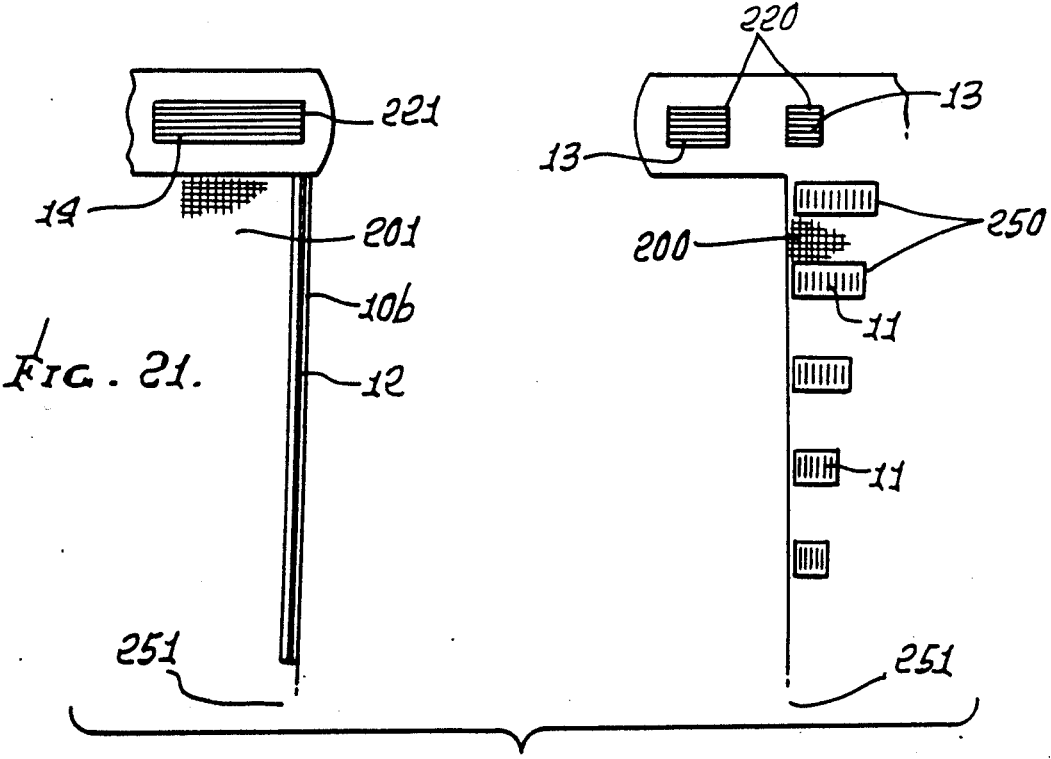

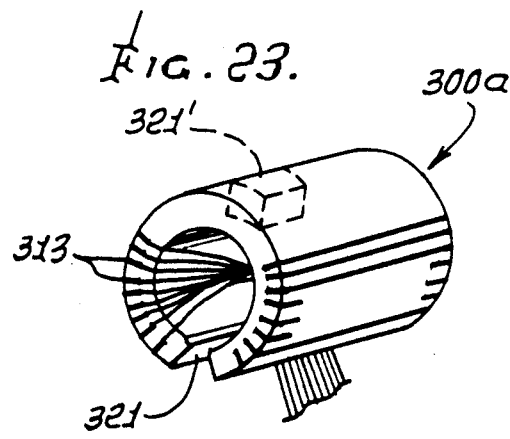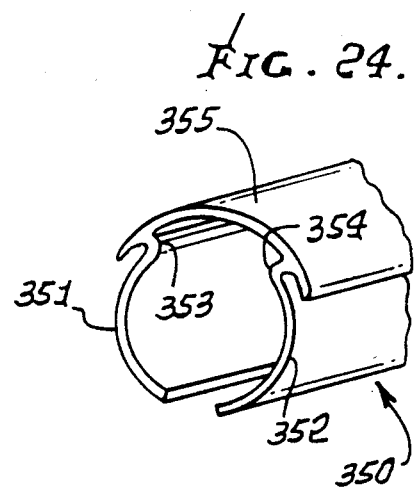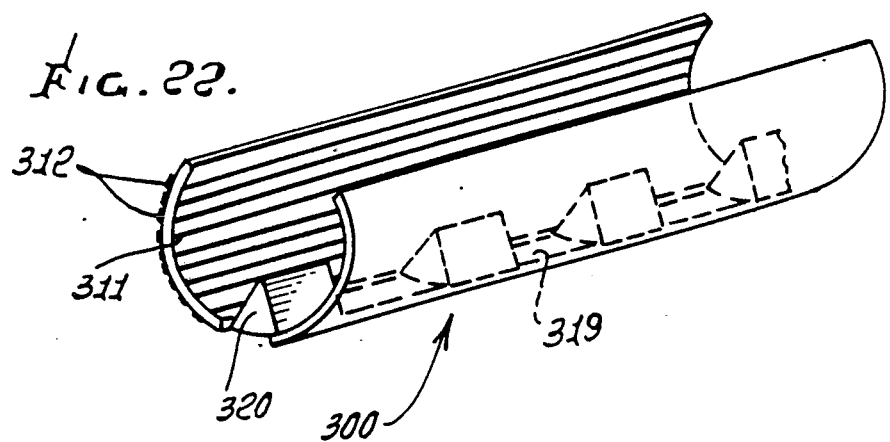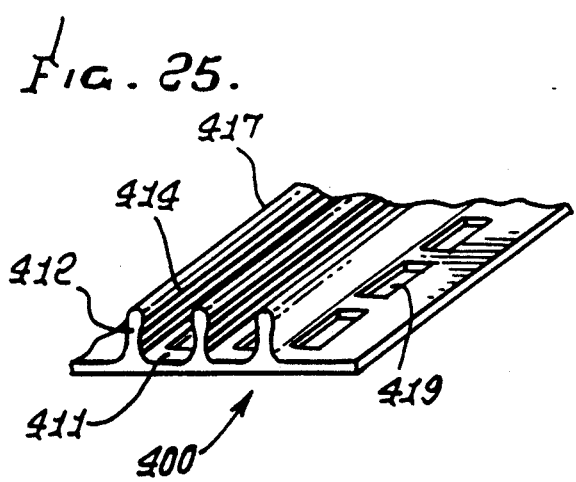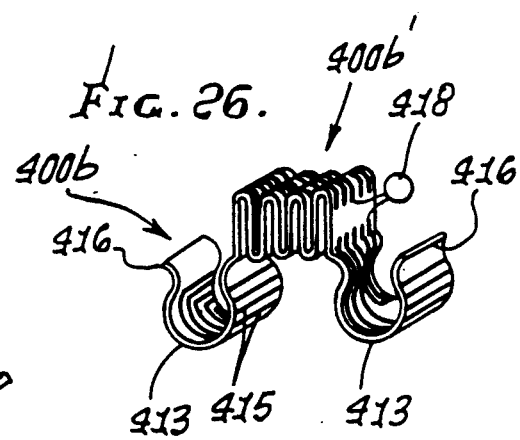

CONNECTOR APPARATUS

BACKGROUND OF THE INVENTION

This invention is a refinement or improvement of the generally looping strap-like connector of U.S. Pat. No. 4872242, which discloses a flexible strap-like connector wherein randomly cut lengths of one of the connector could be nested into and gripped by the "C" shaped cross section of the opposite end of the connector.

FIGS. 1 and 11 of that patent disclosed a generally round split tubular connector which could be manufactured in a diameter similar to a string, cord or lightweight rope. Those connectors could connect without the need of a knot. The connection would not have the bulk of a knot which would be desirable in certain applications. The connector could easily be peeled apart at the point of connection in order to tighten or loosen the connector more readily than if a knot was used. A major and unique advantage of the connector would be that the connection can be accomplished at any random point along the longitudinal length of the connector; however, lateral connection would require precise alignment. Currently, the only non-adhesive connector which allows a longitudinal and lateral random connection is a hook and loop type connector, sometimes marketed under the name "VELCRO." Hook and loop connectors do not lend themselves to string, cord or lightweight rope applications. Typically, most hook and loop applications involve repeated connections wherein the connector is connected, more or less randomly, longitudinally and laterally, at the same point. Ease of connection is facilitated because precise alignment and manipulation are not required. In most applications the purpose of hook and loop connectors is primarily to control longitudinal movement in one direction. An equally strong connection is provided in all directions but is unnecessary. Increased shear strength in the requires direction may necessitate more surface area of hook and loop connector than desirable. Shear strength of hook and loop type connectors can be improved by increasing the diameter and strength of the hooks and/or loops; however the greater resistance to disconnection for many consumer applications would not be desirable. Moreover, for many applications, accidental connection is unavoidable and undesirable. Hook and loop connectors do not work well with certain looping materials such as sweaters, as they may be accidentally connected with the material. Additional problems would be that they could be fouled with lint and fibers and weaken too quickly with use. Because of these and other reasons, zippers, buttons, snaps, buckles, hooks, etc., are the connectors of choice for many applications.

There is need for reliable, easily produced extruded or molded, strong connectors of the types hereinafter described which are reusable, longitudinally and laterally adjustable, have greater shear strength per square inch than hook and loop connectors, are easily disconnected, do not tend to accidentally connect, do not have hooks which could accidentally hook on to loop material or collect lint or fibers and which provide an improved alternate method of connection for certain applications.

SUMMARY OF THE INVENTION

Some versions of the connector claimed by U.S. Pat. No. 4,872,242 consisted of two specialized parts, one part "C" shaped cross section would nest the other part "C" shape. Similarly, the connector disclosed herein typically would also have two specialized parts, however, one typically would have a series of specialized "C" shaped cross sections, and the second a series of ridges shaped to nest into and be held by the "C" shaped cross sections. The portions of the connector to be nested as disclosed herein may consist of one, two or more ridges which may be positioned on the connector to skip every 2nd, 3rd, or more "C" shaped cross section of the first connector part, so that the "C" shaped cross sections may flex open without interference from the adjacent cross sections during connection. Also, only one or a few ridges may be needed to insure adequate shear strength or inversely only one or a few "C" shaped cross sections on a connector part may be needed to connect to a connector with a series of ridges.

The "C" shaped cross sections may be 1/12 inch or smaller, and up to one inch or larger in diameter, depending on the desired application. A wide variety of multi "C" shape connectors is possible. For instance, it would be desirable to be able to randomly place displays or other objects on decorative wall systems made from wood, metal or other generally inflexible material. If a wall system had a series of "C" shaped, generally inflexible, cross sections or ridges and the object to be mounted was connected to a connector with flexible "C" shaped cross sections or flexible ridges, random mounting could occur.

For certain applications, it would be desirable if a two-part connector were made of metal. If one or both parts of a connector were made of a relatively thin gage of stainless steel, sufficient to allow flexing and nesting of a connector part, a metal connector as hereinafter disclosed and claimed, is possible.

A connector which has found considerable use is the NYLON bundle tie. These connectors typically may be ¼" wide by 6" long and used for many types of connections besides connecting bundles of wires. When connected, bundle ties often have relative long unused portions which may be cut off and wasted. Bundle ties allow random longitudinal connection once the end of the tie has been inserted into and pulled through the buckle.

With the "C" shaped strap of the prior patent, opposite ends could be pulled together then nested. With certain applications, greater tension and tightening can be achieved if there is a hole in the body of the strap large enough for the insertion and pulling through of the opposite strap end, with the hole flexed further open and with application of leverage.

Some shoes have hook and loop type straps. Typically these straps run through a rectangular metal loop which allows for less shear strength of the connector while at the same time allowing the simultaneous pulling together of both sides of the shoe opening. For certain applications it is advantageous to have the connector strap not double back upon itself through the metal loop, but simply connect one side of the shoe to the other if sufficient tightening and pulling together of the shoe opening and shear strength can be achieved.

Many types of casual pants and shorts are connected by the use of metal hooks, buttons and zippers. No adjustment of waist size is normally possible. To partially overcome this problem, elastic material is sometimes used in the waist band. For some types of pants and shorts, belts are used to adjust tightening; however, belts are not appropriate for many articles of clothing such as tennis shorts. Specialized versions of the connector hereinafter claimed would allow adjustment to pants and shorts presently not practical with other types of connectors.

There is a need for easily produced multi-circuited electrical connectors which are reusable and have longitudinal and laterally adjustable circuits which would allow transistors and other electrical components to be easily connected to a desired circuit. If a single "C" shaped connector is provided to have two or a series of electrical circuits on the inside of the connector's "C" shaped cross section and a "C" shaped connector with circuits on the outside, with electrical leads, or components, attached thereto were inserted, the desired circuits could be connected.

The connector can be virtually as simple as a modified extension cord with two electrical circuits and with the ability to be tapped into at any random point. A somewhat different type of connector can, for instance, be essentially a three dimensional circuit board. It would be inflexible and have ten parallel "C" shaped cross sections each with ten parallel circuits, for a total of one hundred parallel circuits. Also, the nesting and gripping ability of the connector would allow many connections without the need of solder. Single "C" shaped or multi-ridged or "C" shaped connectors each with the desired circuits or components can be used with multi "C" shaped connectors functioning as circuit boards.

A major object of the invention is to provide connectors meeting the above needs which not only allow random longitudinal connection as claimed in U.S. Pat. No. 4872242 but random lateral connection, the two part basic connector consisting of:

(a) a flexible, lengthwise elongated, strap-like body having a series of generally "C" shaped cross section grooves in plains perpendicular to, or parallel with the length dimension of the body, and (b) A flexible lengthwise elongated strap-like body having a series of generally "C" shaped ridges conformed to nest into and be held by the "C" shaped cross section of the aforementioned strap.

It is an object of this invention that the ridges be a modified filled-in "C" shape in cross section or alternately, hollow open and "C" shaped where connected to said strap or hollow and closed.

It is another object of this invention that the walls of the "C" shaped cross sections may be flexible.

It is another object of this invention that the walls of the "C" shaped cross sections may be inflexible.

It is another object of this invention that the ridges of the connector may be flexible.

It is another object of this invention that the ridges of the connector may be inflexible.

It is another object of this invention that a two part connector may have a first part with flexible walls of the "C" shaped cross sections combined with a second part of the connector with generally inflexible ridges.

It is yet another object of this invention that a two part connector may have a first part with inflexible walls of the "C" shaped cross sections combined with the second part of the connector with generally flexible ridges.

An additional object of the invention would be that external and/or internal teeth may be provided which may be spaced at right or sloping angles to the length dimension of the "C" shaped grooves, the teeth configured and projected to mesh together (as into valleys between other teeth) or holes through the body of the connector placed alternately between the teeth, when the connector parts were nested.

It is an additional object of the invention that the height of the teeth would be less than 50% of the interior dimension of the "C" shaped cross section so that if the teeth do not align with the holes through the body and/or with the valleys during nesting, allowing only partial nesting, any longitudinal movement of the partially nested "C" shaped ridges would allow the pinching action of the "C" shaped cross sections to fully nest the "C" shaped ridges and mesh the teeth into the valleys when teeth and hole or valley alignment occurred.

It is an additional object of the invention that an upwardly rounded portion of a connector occur where two "C" shaped cross sections connect, as opposed to say a flat connection, so as to guide and align the rounded ridges into the "C" shaped cross sections when two connector parts are more or less randomly pressed together.

It is an additional object that the teeth may be dovetailed to allow improved meshing and holding. Alternately, teeth may slope to allow improved meshing in one direction and slipping of the teeth in the other direction in order to allow tightening without disconnection.

It is an object of the invention that the connector could be produced with the approximate thickness, width and flexibility of a hook and loop type connector.

It is an additional object of this invention that a wall system made of wood or other non-flexible material could be manufactured with "C" shaped cross sections that would allow the mounting of objects by the use of flexible ridges or "C" shaped connectors.

It is an object of this invention that the multi "C" shaped connector be made of relatively thin stainless steel or other metal of a gage sufficient to allow flexing and nesting.

It is an additional objective of the invention that the connector could be produced approximately $\frac{1}{8}$ to $\frac{1}{4}$ inch wide, so as to provide an alternate type connector to synthetic resin bundle ties.

It is an object of the invention that the connector be incorporated into a specialized shoe connector not needing shoe laces or hook and loop type connectors, which allow a shoe to be firmly tightened or loosened more easily than currently possible.

It is an object of this invention that the connector be incorporated into a specialized pants connector allowing connection and waist adjustment without the use of zippers, hooks, buttons, hook and loop connections or elastic. In this regard, it is an object of this invention that the "C" shaped channels of a connector part may be angled to align on a radial point.

It is an additional object of this invention that the single "C" shaped connector of claim 1, U.S. Pat. 4,872,242, have a hole through its body wherein the hole would be larger than the diameter of the "C" shaped body when inserted into the hole.

It is an object of this invention that there would be one or more electrical wires or strips on the interior of one or more "C" shaped channels, which, if a "C" shaped connector or ridge with electrical wires or strips on the exterior were nested into said channel(s), an electrical connection would occur.

It is an additional object of this invention that precise alignment of the electrical wires or strips would be achieved by having a hole or recess in one connector part and a ridge in the other connector part which would fit into such recess to control alignment.

It is an additional object of this invention that precise alignment of the electrical wires or strips would be achieved by having one or two flanges on a ridge or "C" shaped connector that when nested, the flange or flanges would rest on the upper edge or edges of the nesting "C" shaped connectors sides.

These and other objects and advantages of the invention, as well as the details of an illustrative embodiment, will be more fully understood from the following specification and drawings, in which:

DRAWING DESCRIPTION

FIGS. 1–26 show various forms of the invention.

DETAILED DESCRIPTION

Note in FIG. 1 the flexible, lengthwise elongated body 10 in the form of a thin strip or web of material having one or more recesses 11, with typically multiple and generally "C" shaped cross-sections, the recesses extending laterally and spaced apart longitudinally. They are formed by upright parallel cantilever walls 12 integral with body strap 10. The connector also has body or web extend 10a carrying one or more lateral ridges 13 parallel to the screws, and configured to nest into and be gripped by the walls of certain recesses, such cantilever walls deflected or spaced (expanded) by the inverted ridges. One or more such ridges are fitted into one or more of the recesses, to form a connector; and web 10a may be connected to web 10, i.e. looped back over the latter, as shown. The ridges and walls may be extended laterally, or longitudinally; and the ridges 13 may have "C" shaped terminals insertable into "C" shaped recessed formed by the walls 12; thus, the walls may narrow near their junctions with web 10; and the ridges 13 may narrow near their junctions with web 10a.

It is another feature that two or more ridges are spaced so that when engaged into the "C" shaped cross sections one or more "C" shaped cross sections would not be engaged between the ridge so that the "C" shaped cross sections can flex during engagement and/or disengagement. See FIG. 1. This permits a high degree of adjustability.

In FIG. 2, the connector 20 is like that of FIG. 1, but has teeth 21 in the recesses designed primarily to control movement in one or two directions parallel with the "C" shaped channels. Walls of the "C" shaped channels may be flexible or inflexible. See also slots 19 in web 20, arranged so that the slots alternate longitudinally with the teeth in the recesses. This adds to flexibility of the web 10.

In FIG. 3, holes 26 are provided in the web 10a that carries the ridges 23. The ridges and holes alternate, longitudinally, as shown. Thus web 10a is quite flexible. Holes 26 extend in longitudinal rows, and modified ridges 23, in sections, extend in longitudinal rows. FIG. 4 shows the modified ridges of FIG. 3 nesting in the modified recesses of FIG. 2.

FIG. 5 shows a modified ridge 33, which is dovetailed, in cross section. It fits with "C" shaped recess 31 between teeth at 32 with walls at 32'. Spacing between successive ridge surfaces at 33' is slightly less than spacing between successive walls at 32', so that interference fit is provided and wall spread occurs, as does interlock. An alternate ridge surface may be provided at 34' to allow ridge 33' to be adjusted longitudinally in recess at 31 and longitudinally ride over teeth at 32 to next recess at 31' without disengagement of connector parts.

In FIG. 6, the design is like FIGS. 2–4, except that teeth 21 are modified to the form 21', integral with the bottoms of ridges 23. Those teeth 21' engage the slots at 19' in web 10'.

FIG. 7 shows dovetailed ridges with dovetailed teeth 21' meshed into openings 19 at bottoms of "C" shaped openings. Alternate ridge with tooth surface 34 allow connector adjustment in one direction without connector disengagement.

FIG. 8 shows a specialized connector used on a shoe, to replace laces. Note opposite alternate tongues at shoelace eyelet locations 40 (like webs 10a) carrying ridges at their underside (like ridges 13), which interfit into recesses 11 on two spaced parallel straps 41 like webs 10. The tongues 40 extend laterally, and the straps 41 extend longitudinally. Each strap carries tongues, as shown, and the straps are integral with left and right "uppers" 44 and 45, as shown. FIG. 9 is an enlarged cross section taken on FIG. 8. Alternately connector at FIG. 1 may be used.

FIG. 10 is an enlarged view showing modified ridges 63 receivable in modified recesses 61 formed by modified walls 62. The ridges have hook shape in cross section, at 64, to hook under edges 65 formed by the walls 62. Connectors using hooks primarily control longitudinal movement in one direction plus vertical movement. Disconnection of connector parts requires peeling up of connector part (with ridges) on side opposite hooks. Connection is improved by asymmetric ridges narrowing to a point furthest from the strap.

In FIG. 11, the modified ridges 73 are asymmetric, and offset to exert shear pressure or force on the bases 75 of the side walls 72 defining the recesses 71 into which the ridges fit. Connectors using these modified cross sections primarily control longitudinal movement in one direction. Note lengthwise regular locations of the ridges and recesses or channels, all on the same web or strap. Disconnection of ridges 73 from "C" shaped channels 71 is simplified, requiring pulling apart rather than peeling apart required for connector with hooks as in FIG. 10. FIG. 12 shows a further modification similar to that of FIG. 11. See ridges 86 and 89, recesses 87, and walls 88. Ridges with these modifications allow inflexible walls 88.

FIG. 13a is a top view of a mushroom shaped ridge 93, and FIG. 13b shows a side view of the ridge 93. It fits in a recess as previously disclosed. FIGS. 14a and 14b are plan and elevation views of a web 10a carrying multiple mushroom shaped connector parts.

FIG. 15 shows a strap or web 100 with a "C" shaped recess 111, having a bottom hole 113 sized to allow thread-through of another section of the strap.

FIG. 16 shows an undulating web 120 (corresponding to web 20, FIG. 2) forming recesses 11 as previously disclosed. Walls are defined by the web itself. Teeth 21 are located at the recess bottom, as in FIG. 2. The strap or web 120 may consist of stainless steel. See also screw connectors 123.

FIG. 17 is a top view of one connector channel 11 (as in FIG. 16) showing V-shaped teeth 21 designed to control ridge movement, in two opposite longitudinal directions. Successive teeth taper in opposite directions. In FIG. 18, this alternate tooth design shows tooth taper in one direction, to allow ridge connector at FIG. 19, adjustment in one direction.

FIG. 19 shows an undulating web 120a (corresponding to web 10a FIG. 19) defining ridges 133 formed to enter recesses 11 in FIG. 16. Slots 135 fit over or engage the teeth 21. FIG. 20 is a top plan view of the FIG. 19 web and slots 135. See fasteners 136 in FIG. 19. Teeth at FIG. 17 and FIG. 18 may alternately be used on the bottom of the ridges 133 of FIG. 19 to engage teeth 21 of connector at FIG. 16.

FIG. 21 shows application of the invention to a pant connector. See pant right section fabric 200 carrying spaced sections 250 of web 10 in FIG. (as at button locations), that web carrying recesses 11 as in FIG. 1. Recesses 11 are angled to align with common point 251. Pant left section fabric 201 carries one elongated web 10b ( like 10b in FIG. 1) that carries ridges 12 to enter recesses 11 as described above, when pant section 201 rotates at common point 251 and is adjustably interconnected in lapping relation with pant section 201. Vertical ridges and recesses then prevent lateral or sideward separation of the pant sections. See also spaced sections 220 of connector 10, as in FIG. 2 carrying horizontal C-shaped channels 13, on pant section 200, to adjustably receive horizontal ridges 14 of connector 221 as in FIG. 3 on pant section 201. Connector 221 with alternate sloping ridge surface at 34, FIG. 5 allow first the connection to connector 220, then horizontal tightening of pant sections 200 and 201, then the connection of the connector at 10b to spaced connector sections 250. After connection pant section 200 would be on the outside.

FIG. 22 shows a C-shaped web 300 (corresponding to web 100 in FIG. 15) with recesses formed by longitudinal metallic electrical current strips 311 on the interior of the C-shaped channel. Parallel strips 312 are spaced about on the outside of the web, and extend longitudinally, as does the web 300. Those recesses receive corresponding metallic strips 312 on a web 300 like 10b, when the two are nested together, forming circuit interconnection. Internal teeth 320 on the web 300 interlock with holes 319 in the web 300 to control rotational and lengthwise relative movement of the nesting webs. web 10 in FIG. 1 (as at button locations), that web carrying recesses 11 as in FIG. 1. Recesses 11 are angled to align with common point 251. Pant left section fabric 201 carries one elongated web 10b (like 10b in FIG. 1) that carries ridges 12 to enter recesses 11 as described above, when pant section 201 rotates at common point 251 and is adjustably interconnected in lapping relation with pant section 201. Vertical ridges and recesses then prevent lateral or sideward separation of the pant sections. See also spaced sections 220 of connector 10, as in FIG. 2 carrying horizontal C-shaped channels 13, on pant section 200, to adjustably receive horizontal ridges 14 of connector 221 as in FIG. 3 on pant section 201. Connector 221 with alternate sloping ridge surface at 34, FIG. 5 allows first the connection to connector 220, then horizontal tightening of pant sections 200 and 201, then the connection of the connector at 10b to spaced connector sections 250. After connection, pant section 200 would be on the outside.

FIG. 22 shows a C-shaped web 300 (corresponding to web 100 in FIG. 15) with recesses formed by longitudinal metallic electrical current strips 311 on the interior of the C-shaped channel. Parallel strips 312 are spaced about on the outside of the web, and extend longitudinally, as does the web 300. Those recesses receive corresponding metallic strips 312 on a web 300 like 10b, when the two are nested together, forming circuit interconnection. Internal teeth 320 on the web 300 interlock with holes 319 in the web 300 to control rotational and lengthwise relative movement of the nesting webs. FIG. 23 shows the C-shaped web 300a with external electrical strips at 313, like ridges 13 of FIG. 1, sized to nest into web 300 of FIG. 22. Strips at 313 are aligned to engage strips 311 of web 300 when opening 321 nests over teeth 320. Alternate opening 321' may be used to engage tooth 320. FIG. 24 shows a C-shaped cover 350, to fit over and protectively cover the web 300 of FIG. 22. Note walls 351 and 352 hinged at 353 and 354 to carrier wall 355. Items 300 and 300a may consist of insulative plastic material.

FIG. 25, like FIG. 1, FIG. 2 or FIG. 6 shows a connector 400 having a series of metallic electrical circuit strips 414 on the walls 412 that form the recess 411. Strips 414 extend lengthwise of the recesses or channels. FIG. 26 shows a nesting connector part, or web 400b, like 10b in FIG. 1, or 120a in FIG. 19, with electrical circuit strips 415 on the undulating ridges 413. Strips 415 are engagable with the strips 414 in FIG. 25, when ridge 413 interfits recess 411. Expansion part 400b allows alternate channel 411 engagement. Flange 416 connects with top of C-shaped channels 417 of FIG. 25 to align circuit strips 414 and 415. Circuits 414 of FIG. 25 143 connected to 414 circuits of another 411 channel when connector part at FIG. 26 is nested into selected channels and the desired circuit strips are interconnected by one or more electrical components 418. Connector at FIG. 26 may have one or multiple circuit strips 415. Connectors at FIG. 22 and FIG. 23 may alternately be used with connector at FIG. 25.

I claim:
1. An elongated connector, comprising
(a) a flexible, lengthwise elongated first body part having a plurality of generally flexible C-shaped cross sections defining recesses in planes crosswise of and normal to a major dimension of said body part,
(b) said first body part having a base and a succession of side walls together defining said C-shaped recesses, each side wall having a mid-section and an outer side wall portion, said mid-section being sufficiently narrow to allow said upper side wall portion to flex, certain of said side walls also forming a side wall of an adjacent C-shaped cross section recess,
(c) the common side walls of said C-shaped cross section recesses having upwardly convex terminii which are inverted relative to said C-shaped recess cross sections,
(d) and a second body part having a plurality of substantially inflexible ridge members configured to nest in and be gripped by the side walls of certain of said recesses which are expanded by said ridge members,
(e) and wherein said ridge members are spaced apart from one another and fitted in said certain C-shaped recesses spaced apart and separated by at least one other of said recesses bridged over and unoccupied by said second body part;
(f) and including means associated with said base to confirm complete adjusted interlock of said first and second parts.
2. The connector of claim 1 wherein the "C" shaped cross section recesses run parallel with the lengthwise direction of the body.

3. The connector of claim 2 wherein the interior of the C-shaped cross section has a hook like flange on one side and the ridges generally matching hook like flanges so that the flanges hook to secure the body from being pulled apart in the direction of the flanges, while at the same time the end of the body with ridges can be disengaged by peeling up that so as to disengage first the non-flange side of the ridges.

4. The connector of claim 3 where there are no flanges and the ridge is wedge shaped so that shear pressure will be exerted by the tip of the wedge shaped ridge at the base of the "C" shaped cross section when tension is applied to the connector ends.

5. The connector of claim 4 wherein the interior of the C-shaped cross section is deformed and thickened at one side of the C-shaped cross section so as to nest and receive shear pressure from the wedge-shaped ridge at a point near the C-shaped cross-section base.

6. The connector of claim 1 wherein the "C" shaped cross section recesses run perpendicular to the lengthwise direction of the body.

7. The connector of claim 6 wherein the interior of the C-shaped cross section has a hook-like flange on one side and the ridges generally have matching hook like flanges so that the flanges hook to secure a body from being pulled apart in the direction of the flanges during connection, while at the same time the end of the body with ridges can be disengaged by peeling up that so as to disengage first the non-flange side of, and including said strap formed by said body.

8. The connector of claim 7 wherein there are no flanges and the ridge is wedge shaped so that shear pressure will be exerted by the tip of the wedge shaped ridge at the base of the "C" shaped cross section when tension is applied to the connector ends.

9. The connector of claim 8 wherein the interior of the C-shaped cross section is deformed and thickened at one side of the C-shaped cross section so as to nest and receive shear pressure from the wedge-shaped ridge at a point near the C-shaped cross-section base.

10. The connector of claim 1 wherein the first body part has flat extents underlying said recesses.

11. The connector of claim 10 wherein the second body part also has flat bases underlying said ridges, said flat bases merging to form a connector.

12. The connector of claim 11 wherein base, said cross sections and ridges are relatively narrower at points of connection to the base, relatively wider and then narrower relatively further from the base, and relatively narrower at their furthest points from the base.

13. The connector of claim 1 wherein the connector consists of two elongated parts, one part wherein the body has a flat base underlying said recesses and the second part wherein the body also has a flat base underlying said ridges.

14. The connector of claim 13 wherein two connector bodies with recesses are affixed to a shoe, generally in the location of the shoe lace eyelets, there being affixed to each body, two or more connector bodies with ridges opposing and offset from each other, so as to allow the simultaneous pulling together of the shoe opening with two hands and allowing shoe tightening similar to that achieved by using shoe laces.

15. The connector of claim 13 wherein the bodies consists of metal.

16. The connector of claim 13 wherein one connector part consists of synthetic resin.

17. The connector of claim 15 wherein the metal is thin enough to allow some flexibility.

18. The connector of claim 13 wherein the walls of said recesses are generally inflexible and define a generally rectangular sheet.

19. The connector of claim 13 wherein the ridges are generally flexible.

20. The connector of claim 1 wherein said last named means includes teeth spaced at and along the bases of the recesses.

21. The connector of claim 20 wherein the teeth are dovetailed.

22. The connector of claim 20 wherein the teeth are angled in one direction.

23. The connector of claim 22 wherein the teeth are angled alternately in one direction and then in another.

24. The connector of claim 20 wherein the teeth are rectangular in cross section.

25. The connector of claim 20 wherein the ridges in their lengthwise direction are discontinuous and their lengths are less than the spaces between said teeth so that the ridges, while nesting in the C-shaped cross section recesses, will also mesh with said teeth.

26. The connector of claim 25 wherein the ridges have end surfaces angled to match the angle of the teeth.

27. The connector of claim 25 wherein there are teeth on the ridges and spaces within the C-shaped cross sections configured to allow meshing of the teeth.

28. The connector of claim 27 wherein the teeth on the ridges are of approximately the same longitudinal length as the length of the ridges.

29. The connector of claim 28 wherein there are valleys in or holes through the connector spaced so as to allow the meshing of said teeth on the ridges.

30. The connector of claim 20 wherein the height of the teeth is less than 50% of the interior dimension of the C-shaped cross section.

31. The connector of claim 1 wherein there are teeth at the bottom of the recesses and wherein the ridges are defined by generally mushroom shaped protuberances; the outer dimensions of which generally conform to the interior dimensions of the C-shaped cross sections, said mushroom shapes being formed by pressing relatively stiff plastic fibers projecting from a body onto a hot surface and the stems of the protuberances allowing for some flexibility in order to assist alignment when press fitting the mushroom shapes into the C-shaped cross sections.

32. The connector of claim 1 wherein the connector is metallic and resembles a series of connected "S's".

33. The connector of claim 32 wherein the "C" shaped cross sections have teeth.

34. The connector of claim 33 wherein the ridges have slots spaced and aligned to receive said teeth.

35. The connector of claim 34 and wherein the teeth and ridges are reversed.

36. The connector of claim 33 wherein the teeth face alternately in both directions.

37. The connector of claim 33 wherein the teeth face in one direction.

38. The connector of claim 1 wherein the ridges and C-shaped cross sections have teeth facing in opposite directions and spaced so as to provide interlocking in one direction only.

39. The connector of claim 1 wherein there are holes in the body.

40. The connector of claim 1 wherein there are electrical conductors on the interior surfaces of the C-shaped cross sections.

41. The connector of claim 1 wherein there are electrical conductors on the exterior surfaces on at least one of the ridges.

42. The connector of claim 1 wherein there are electrical conductors on the interior surfaces of the C-shaped cross sections and electrical conductors on the exterior surfaces of the ridges, said conductors on said interior surfaces connected with said conductors on the ridge exterior surfaces.

43. The connector of claim 1 wherein two of said ridges are spaced so that when engaged into the C-shaped cross sections, two adjacent C-shaped cross sections would be engaged so that the side common to each C-shaped cross section would generally not flex during engagement and/or disengagement.

44. The connector of claim 1 wherein there are one or more reinforcing strands within the connector body.

45. The connector of claim 1 wherein there are one or more elongated reinforcement elements within or on the connector.

46. The connector of claim 1 comprising:
(a) a flexible, lengthwise elongated strap-like body consisting of synthetic resin and having generally C-shaped cross section in planes crosswise of and normal to the length dimension of the body,
(b) the body having opposite C-shaped end portions which are interfitted so that one C-shaped cross section end portion nests in and is gripped by the other C-shaped cross section end portion each C-shaped cross section end portion having opposite walls, the walls of said one end portion yieldably deflected toward one another and gripped by the wall of said other end portion which are yieldably expanded away from one another,
(c) and wherein portions of the connector are made of different materials.

47. An elongated connector, comprising
(a) a flexible, lengthwise elongated first body part having a plurality of generally flexible C-shaped cross sections defining recesses in planes crosswise of and normal to a major dimension of said body part,
(b) said first body apart having a base and a succession of side walls together defining said C-shaped recesses, each side wall having a mid-section and an outer side wall portion, said mid-section being sufficiently narrow to allow said upper side wall portion to flex, each of said side walls also forming a side wall of an adjacent C-shaped cross section recess,
(c) the common side walls of said C-shaped cross section recesses having upwardly convex terminii which are inverted relative to said c-shaped recess cross sections,
(d) and a second body part having a plurality of substantially inflexible ridge members configured to nest in and be gripped by the side walls of certain of said recesses which are expanded by said ridge members,
(e) and wherein said ridge members are spaced apart from one another and fitted in said certain C-shaped recesses to form said connector, successive of said certain C-shaped recesses spaced apart and separated by at least one other of said recesses bridged over and unoccupied by said second body part.

48. An elongated connector, comprising
(a) a flexible, lengthwise elongated first body part having generally flexible C-shaped cross section means defining recess means in planes crosswise of and normal to a major dimension of said body part,
(b) said first body part having a base and a succession of side walls together defining said C-shaped recess means, each side wall having a midsection and an outer side wall portion, said midsection being sufficiently narrow to allow said upper side wall portion to flex,
(c) said side walls having upwardly convex terminii which are inverted relative to said C-shaped recess means,
(d) and a second body part having ridge means configured to nest in and be gripped by the side walls of certain of said recess means which are expanded by said ridge means,
(e) and wherein said ridge means has surface means spaced apart and fitted in said certain C-shaped recess means to form said connector,
(f) and including means associated with said base to confirm complete adjusted interlock of said first and second parts.

49. The combination of claim 48 wherein said ridge means includes at least one ridge.

50. The combination of claim 48 wherein said recess means includes at least one recess.

51. An elongated connector, comprising
(a) a flexible, lengthwise elongated first body part having recess means including a plurality of generally flexible C-shaped cross sections defining recesses in planes crosswise of and normal to a major dimension of said body part,
(b) said first body part having a base and a succession of side walls together defining said C-shaped recesses, each side wall having a mid-section and an outer side wall portion, said mid-section being sufficiently narrow to allow said upper side wall portion to flex, each of said side walls also forming a side wall of an adjustment C-shaped cross section recess,
(c) the common side walls of said C-shaped cross section recesses having upwardly convex terminii which are inverted relative to said C-shaped recess cross sections,
(d) and a second body part having ridge means configured to nest in and be gripped by recess side walls which are expanded by said ridge means,
(e) said ridge means fitted in said recess means to form said connector, certain C-shaped recesses spaced apart and unoccupied by said ridge means,
(f) and including means connected with said base to confirm complete adjusted interlock of said first and second parts.

52. The combination of claim 51 wherein said ridge means includes at least one ridge.

53. The connector of claim 1 wherein said second body part of the connector has "C" shaped ridges with an exterior cross section dimension approximately the interior dimension of the "C" shaped cross section of the first body part.

* * * * *